United States Patent [19]

Hsu

[11] Patent Number: 5,661,790
[45] Date of Patent: Aug. 26, 1997

[54] CALL BACK SERVICE FOR A REGULATORY RESTRICTIVE AREA

[75] Inventor: Howard Hsu, Plano, Tex.

[73] Assignee: Ericsson, Inc., Research Triangle Park, N.C.

[21] Appl. No.: 552,368

[22] Filed: Nov. 3, 1995

[51] Int. Cl.⁶ ........................................... H04M 3/48
[52] U.S. Cl. ................. 379/209; 379/201; 379/207; 379/220; 379/230
[58] Field of Search ............................. 379/201, 207, 379/209, 219, 220, 229, 230; 370/60, 62, 110.1

[56] References Cited

U.S. PATENT DOCUMENTS

| | | | |
|---|---|---|---|
| 3,553,385 | 1/1971 | Morgan et al. | 179/18 |
| 4,139,739 | 2/1979 | Von Meister et al. | 379/219 |
| 4,166,929 | 9/1979 | Sheinbein | 179/18 BG |
| 4,885,780 | 12/1989 | Gopal et al. | 379/221 |
| 5,311,583 | 5/1994 | Friedes et al. | 379/209 |
| 5,420,916 | 5/1995 | Sekiguchi | 379/230 |
| 5,425,091 | 6/1995 | Josephs | 379/201 |
| 5,469,500 | 11/1995 | Sattar et al. | 379/201 |
| 5,513,250 | 4/1996 | McAllister | 379/91 |

FOREIGN PATENT DOCUMENTS

| | | |
|---|---|---|
| 61-134157A | 6/1986 | Japan . |
| 3-201756A | 9/1991 | Japan . |
| WO 92/01350 | 1/1992 | WIPO . |
| WO 93/15583 | 8/1993 | WIPO . |
| WO 93/22866 | 11/1993 | WIPO . |
| WO 94/13109 | 6/1994 | WIPO . |

OTHER PUBLICATIONS

Evolving Open Intelligent Networks for Global and Broadband Services by David M. Penkler and Nicolas Raguideau 1994–95 Annual Review of Communications.

Transparent Message Routing Between an SS#7 Network and X.25 Network IBM Technical Disclosure Bulletin vol. 35 No. 3, Aug. 1992.

Mazo et al., "General Characteristics of Intelligent Networks," Electrical Communication—vol. 63, No. 4 1989.

Batten, "Personal Communications Services and the Intelligent Network," British Telecommunications Engineering, vol. 9 Aug. 1990.

*International telephone calls: The privateers*; Sep. 12, 1992; The Economist; p. 79.

Peter Coy, Mark Lewyn, Charles Hoots; *Rome To Bonn Via New Jersey*, Apr. 13, 1992; Business Week; pp. 84–85.

*Primary Examiner*—Krista M. Zele
*Assistant Examiner*—Daniel S. Hunter
*Attorney, Agent, or Firm*—Jenkens & Gilchrist

[57] ABSTRACT

A telecommunications system receives a call back request though a separately maintained computer network, such as an X.25 based computer network, and initiates the actual call back toward the requesting subscriber using its own Signaling System No. 7 (SS7) telecommunications network. If the call back request fails, an X.25 packet containing an error code is transmitted back to the originating subscriber over the separately maintained computer network. An X.25<=> TCAP converter is used as an interface card to allow X.25 packets to communicate freely with TCAP based telecommunications network.

19 Claims, 1 Drawing Sheet

CALL BACK SERVICE FOR A REGULATORY RESTRICTIVE AREA

BACKGROUND OF THE INVENTION

1. Technical Field of the Invention

The present invention relates to a call back Subscriber feature in a telecommunications network and, in particular, to the use of an X.25/TCAP protocol converter for exchanging feature information between two telecommunications switches.

2. Description of Related Art

Developments and improvements in the telecommunications switching systems have allowed telecommunications subscribers to enjoy a vast number of high-level special subscriber features such as Class Automatic Callback (CAC) and Class Automatic Recall (CAR) provided by the Common Channel Signaling (CCS) Signaling System No. 7 (SS7) protocols. These subscriber features allow a first subscriber located in one switch to call back or recall a second subscriber located in another switch. If the second subscriber is already busy, the telecommunications network monitors the busy line until it goes idle and then establishes a connection between the first and the second subscribers. With the introduction of such subscriber features, subscribers do not have to repeatedly dial their busy calling parties' numbers until a connection is established or even have to know the telephone number of the party the subscriber has lastly spoke with. However, even though these subscriber features have overcome technical hurdles and allowed the first subscriber to merely enter a service code and wait for the network to call him back when the second subscriber goes idle, the features still cannot overcome politically placed telecommunications hurdles.

These hurdles or restrictions are usually placed by a local government for political or religious reasons and do not allow Signaling System No. 7 (SS7) or Channel Associate (CAS) signaling on the outbound traffic if the calls are directed toward certain "undesirable" countries. Accordingly, these restrictions imply that outbound SS7 calls to selected countries are not allowed, and only incoming SS7 calls are accepted. Therefore, if a telecommunications subscriber residing within a politically restricted telecommunication network area wishes to make a restricted outgoing international call, he or she would have to first call another switch placed in an unrestricted third country and then either manually or automatically relay that call to the desired restricted destination by having the third switch initiate a new call setup and transfer the call.

Therefore, it would be a desirable capability for a first telecommunications subscriber to place a call back request through a different network than the restricted SS7 telecommunications network and have the second telecommunications subscriber call back the first subscriber through the SS7 telecommunications network. Since only the outgoing calls are restricted toward certain countries, if the first subscriber can request the second subscriber to call back the first subscriber, the actual call back would constitute an incoming call for the restricted switch, and no restriction would bar this call setup.

It would also be another desirable capability for the same call back system to gain favorable international tariff charges by having a second subscriber residing in a favorable tariff country to call back a first subscriber residing in a less favorable tariff country. For example, since calling from Europe to the United States is always much more expensive than calling from the United States to Europe, if a first subscriber residing in Europe could order a call back request through an ubiquitous network and have a second subscriber residing in the United States call back the first subscriber through the SS7 telecommunications network, the actual call connection would be much less expensive for the first subscriber.

Accordingly, it is an enhancement and advantageous over the prior art because there is no longer the need to physically place a call toward a third country before establishing a connection with the desired party.

SUMMARY OF THE INVENTION

In another aspect of the present invention provides a method and apparatus for providing call back subscriber features utilizing two different communications networks.

In another aspect, the present invention provides a system for establishing a communications link between two subscribers located within two different countries where certain outgoing calls are restricted.

In a still further aspect the present invention provides a method and apparatus which allows a telecommunications subscriber connected to a telecommunications network restricting selected outgoing international calls to circumvent the restrictions by requesting a call back from the desired destination caller through an ubiquitous network and receiving an actual call back from that desired destination caller as an incoming call through an SS7 telecommunications network. The call back request is ordered through an Intelligent Peripheral (IP) and transported to the other side using X.25 protocols such as Transmission Control Protocol/Internet Protocol (TCP/IP).

In a further aspect of the invention, the following X.25 messages in the transmission protocol are converted to Transaction Capabilities Application Part (TCAP) or intelligent Network Application Protocol (INAP) SS7 messages and inputted into an Intelligent Network (IN) Service Control Point (SCP). The SCP notifies one of its Service Switching Points (SSP) servicing the desired subscriber, and the notified SSP initiates a call back toward the originating subscriber and also rings the desired destination subscriber. If the desired destination subscriber is busy, the SCP generates a message toward the IP notifying the delay, and the line status of the destination subscriber is monitored until the line becomes idle. Once the line becomes idle, a call back setup is initiated from the SSP toward the originating subscriber and the destination subscriber is also alerted (ringed).

This capability allows subscribers connected to a telecommunications network restricting outgoing international calls to still make a connection with subscribers residing in restricted countries without making an intermediate telecommunications call toward a third country. Furthermore, this same capability allows subscribers residing in high tariff countries to gain favorable tariff charges by having subscribers residing in lower tariff countries to call back the requesting subscribers.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF A PRESENTLY PREFERRED EXEMPLARY EMBODIMENT

Figure 1:
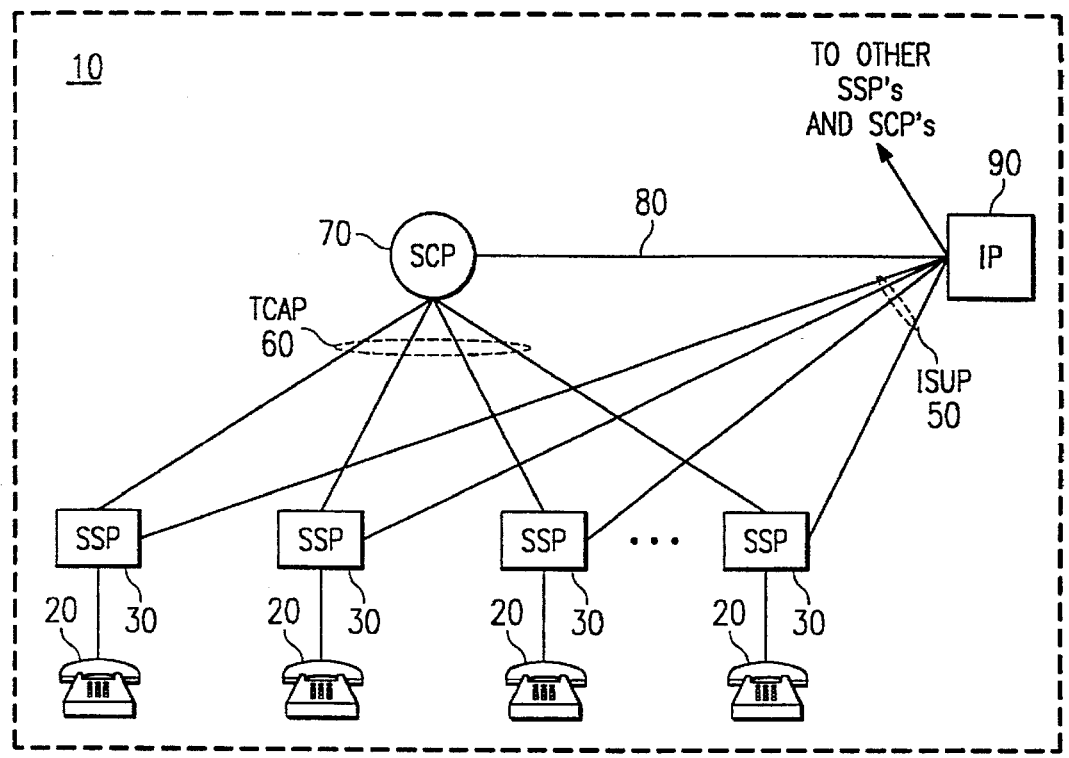
FIG. 1 is a block diagram illustrating an Intelligent Network (IN)

FIG. 1 shows an Intelligent Network (IN) in which the present invention, as will be disclosed herein, may be implemented. In a typical telecommunication network, there are virtually limitless local exchanges and other support computers interconnected with each other to provide telecommunications services to telecommunications subscribers. These local exchange switches and computers are manufactured by different vendors and each may have its own protocols and specifications. Each computer, and each application program in the computer, may require a different communication access method and protocol (i.e., a standard convention for communicating intelligently) for a viable "conversation" to proceed. This sets very specific requirements on either or both parties to the end user in a form that they can recognize and manipulate. This may also involve protocol conversion to accommodate an end user's format, code, and language syntax.

The above problems have led the International Organization for Standardization (ISO) to launch an intensive effort to develop a worldwide communication architecture standard that would allow different systems to communicate openly and resulted in Reference Model for Open Systems Interconnection (OSI). However, it is not the intent of OSI either to be a basis for appraising the conformance of actual implementations, or to provide a sufficient level of details to define precisely the services and protocols or the interconnection architecture. Rather, OSI provides a conceptual and functional framework which allows users to work productively and independently on the development of standards for each layer of the Reference Model of OSI. Accordingly, each network has to develop its own set of detailed specifications conforming to the OSI model to actually achieve compatible telecommunications network.

In the United States and worldwide, the most widely accepted OSI standard for telecommunications communication has been Common Channel Signaling (CCS) and the most commonly used technology for implementing the CCS standard has been the Common Channel Signaling System No. 7 (SS7) protocols created by the International Telephone & Telephone Consultative Committee (CCITT). The CCITT is an UN treaty organization made up of the postal, telegraph and telephone authorities of member countries and its recommended protocol SS7 is rapidly becoming recognized as the international standard. This CCS signaling system, designed using the concepts of packet switching and tailored to conform with the OSI model, has been developed for use with both national and international traffic, for local and long-distance networks, for interexchange signaling, and for various types of channels, including both terrestrial and satellite channels. Furthermore, the introduction of a packet-switched network used to carry call-signaling messages makes other data-handling services possible as well. These services include the Class Automatic Callback (CAC) and Class Automatic Recall (CAR) features.

According to the CAR feature, when a first subscriber calls a second subscriber, the first subscriber's own telephone number is transported along with the second subscriber's number over the SS7 telecommunications network to the local exchange servicing the second subscriber. The local exchange servicing the second subscriber extracts the first subscriber's telephone number from the received SS7 message and stores the number in its own database. After the termination of the initial call, if the second subscriber wishes to recall the first subscriber, the second subscriber merely enters an appropriate service code. Upon receipt of the service code, the local exchange retrieves the stored first subscriber's telephone number from the database and initiates a call setup toward the first subscriber. Similarly, if the first subscriber has the CAC feature, every time the first subscriber makes an outgoing call, the destination telephone number is stored in a database maintained by the local exchange servicing the first subscriber. If the first subscriber wishes to call back the second subscriber after the termination of the initial connection, the first subscriber again merely dials a service code. Upon receipt of the service code, the local exchange retrieves the stored outgoing telephone number and a new call setup is initiated. However, if the second subscriber is already busy when a new call back or recall is initiated, the local exchange servicing the second subscriber queues the call and monitors the busy line until it becomes idle. Once the line becomes available, the local exchange sends a Transaction Capabilities Application Part (TCAP) message to the local exchange servicing the first subscriber notifying that the second subscriber is now available. The local exchange servicing the first subscriber alerts (rings) the first subscriber back and also initiates a new call setup toward the second subscriber. Such advanced intelligent subscriber features are possible because advance application layer messages, such as destination line status and originating party number, are capable of being communicated over the SS7 telecommunications network.

Moreover, with the developments of the above mentioned special subscriber features and other sophisticated telecommunications applications, the telecommunications industry has adopted the term "Intelligent Network (IN)" to denote a concept and architecture to provide vendor-independent and network-independent interfaces between the service logic and the transmission and switching systems of a multi-enterprise telecommunications network. The goals Of the Intelligent Network (IN) are to centralize the control node handling the service execution within a telecommunication network to provide rapid definition, testing and introduction of new services as well as modification of existing services. IN also provides greater flexibility in the design and development of new services in a multi-vendor environment with shorter lead times, and standard network interfaces.

The basic concept behind IN is to move the intelligence out of each local exchange or Service Switching Point (SSP) 30 and centralize the services providing the intelligence in a Service Control Point (SCP) 70. By centralizing the special subscriber services in the SCP 70, a new service can be added in only one place and provided to all subscribers connected to the multiple SSPs 30. Accordingly, one SSP 30 serves multiple telecommunications subscribers or terminals, and one SCP 70 serves multiple SSPs or local switches. The interfaces between SSPs 30 and the SCP 70 are by links 60 utilizing the SS7 Transaction Capabilities Application Part (TCAP) as the application layer protocol. More specifically, Intelligent Network Application Protocols (INAP) sits on top of the TCAP protocols to establish a control dialogue between the SSPs 30 and the SCP 70.

Hardware resources required to execute IN services are grouped and located separately from the SSP 70 in an Intelligent Peripheral (IP) 90. The purpose of such separation is to allow multiple SSPs to share the same resources, to decrease processor load in the SSP 70 and the SCPs 30, and to provide common functionality to all IN services. The resources located in the IP 90 typically include, but not limited to, audio announcements, speech synthesis, speech recognition, voice recognition, DTMF digit reception, audio conference bridges for conferencing, tone generators, storage of customer messages, modems, e-mail, fax, and operator resources. Accordingly, the IP 90 supports the ability for user interaction to allow collection of dialed digits or spoken input from users, as well as provisions of customized announcements to users. The interface between the SCP 70 and the IP 90 is a link 80 also utilizing the SS7 Transaction Capabilities Application Part (TCAP) as the application layer protocol. The reason TCAP is used instead of ISDN is because there is no need for a voice channel between the SCP 70 and the IP 90. The SCP 70 merely instructs the IP 90 to perform a certain specific function toward a specific subscriber, and the actual voice connection for providing special announcements or for collecting User voice for recognition is done via links 50. Consequently, the interfaces between the IP 90 and the SSP 30 via links 50 are through Integrated Service Digital Network (ISDN) User Part (ISUP) which has the capability to transport voice data. These interfaces allow telecommunications subscribers 20 connected to the SSPs 30 to hear and interact with resources located in the IP 90.

Even though the above mentioned IP/SS7 networking is desirable and sometimes mandatory for real-time telecommunications switching services, connections between non-real-time computer systems do not normally utilize the above SS7 telecommunication network since there is no need to transfer data between the two nodes in a real-time basis. Because of these lesser demanding timing requirements, different types of networks are used for connections of computer systems. An example of such a network is the X.25 based network.

The X.25 protocol is a CCITT recommendation that defines connections of terminals and computers to packet-switching networks. Packet-switching networks route packets of data through a network to destination nodes. Even though X.25 is a well-established packet-switching service traditionally used to connect remote terminals to host systems, the X.25 network usually suffers from poor performance and is not acceptable for most real-time telecommunications networks. However, X.25 is well established, well understood, and acceptable for remote terminals or computer access and, most importantly, almost every country has X.25 services. It is also quite easy to build private X.25 packet-switching networks by installing X.25 switching equipment on-site and connecting the sites with leased lines. Lastly, in most countries, the X.25 networks are privately maintained and there are usually no restrictions placed on the X.25 networks.

However, because of the previously mentioned timing requirements in a telecommunication switch and the incompatibility problem that exists between the two protocols, the SS7 telecommunications network and the X.25 based network have not been previously interfaced with each other to provide other advanced subscriber features.

Accordingly, the present invention discloses a system whereby an ubiquitous computer network such as X.25 is combined with an SS7 telecommunications network to provide call back subscriber features to a subscriber wanting to establish a connection from a politically restricted country. Computer networks such as Internet or Ethernet utilizing the X.25 network are already widely available worldwide and, therefore, implementing the preferred embodiment of the present invention using such X.25 networks is cheap and requires little modifications to the existing networks. Furthermore, since call back requests are ordered through an ubiquitous computer network, no strict timing and reliability requirements are required, and only a proper interface is needed to allow the computer network to communicate with the SS7 telecommunications network.

Figure 2:
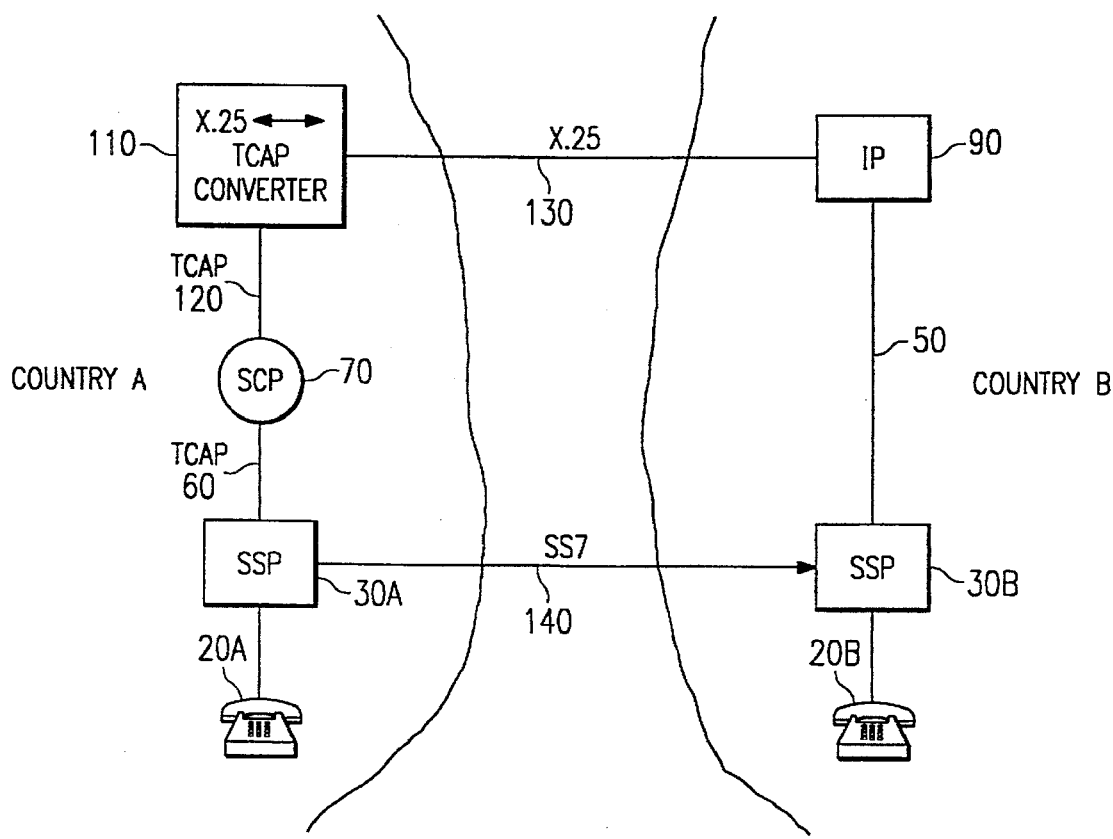
FIG. 2 is a block diagram illustrating how an X.25 network interfaces with an SS7 telecommunications network in accordance with the teachings of the present invention.

Therefore, FIG. 2 represents a logical diagram showing how an X.25 network interfaces with an SS7 telecommunications network according to the preferred embodiment of the present invention. When a subscriber 20B residing within a country that has restrictions on all outgoing international calls toward Country A wishes to establish a telecommunication connection with a subscriber 20A residing in Country A, the subscriber 20B requests a call back by dialing an access number to connect to an IP 90. This access number could be a toll free number (e.g., 800 number in the U.S.). A local switch SSP 30B servicing the subscriber 20B analyzes the received number and determines that it needs to be routed to an Intelligent Peripheral (IP) 90 vis TCAP messages. After the call is routed to an Intelligent Peripheral (IP) by an originating SSP 30B, the subscriber 20B receives a voice prompt for the Calling Line Id (CLI) or account number for validation and the desired destination number from the IP 90. The subscriber 20B inputs the required subscriber data using Dual Tone Multi Frequency (DTMF) signals. Alternatively, the subscriber 20B can input the data using his or her voice, and the IP 90 detects the subscriber data using a voice recognition module. After receiving the validation data and the destination number, the IP 90 performs a validation process and accordingly formats X.25 packets carrying the destination number, originating number, call ID and time clock to be transported to a Converter 110 located in Country A via a X.25 link 130. This link could be any reliable computer network including Internet, Ethernet, or other LAN connections. Once the X.25<=>TCAP Converter 110 receives the X.25 packets from the IP 90, the Converter 110 extracts the necessary information from the X.25 packet messages and converts the information into a TCAP message. After the conversion, the Converter 110 transmits the TCAP Protocol Update Message to the SCP 70 with the call setup information via an SS7/TCAP link 120. Such a converter is needed because the SCP 70 does not have the necessary interface to communicate directly with a communication network running on a different protocol. Therefore, the Converter 110 functions as an interface card between the SCP 70 in Country A and the IP 90 in Country B.

After receiving the TCAP Protocol Update Messages from the Converter 110, the SCP 70 sends Initiate-Call-Attempt or equivalent SS7 messages toward the SSP 30A to instruct the SSP 30A to initiate a call back toward the subscriber 20B over the SS7 telecommunications network. This call setup is represented by a link 140 between the SSP 30A and the SSP 30B. Even though this call back to the subscriber 20B is in response to the subscriber 20B's previous call back request, as far as the telecommunications network in Country B is concerned, it is an incoming call and no restriction check is placed on the connection. After the subscriber 20B is ringed and answered, an announcement is played to notify the subscriber 20B that a call back setup toward the subscriber 20A is being initiated. Concurrently, the SSP 30A initiates another connection from the SSP 30A toward the subscriber 20A. When the subscriber 20A answers the phone, a voice connection is established between the subscriber 20A and 20B through the SS7 telecommunications link 30A. As far as the SSP 30B is concerned, when an international incoming call is received from the SSP 30A, the SSP 30B checks the incoming call ID and reroutes the call to the IP 90 if this incoming call is the call the IP 90 has originally requested through the X.25 network. The IP 90 takes control over the call and connects the incoming call with the subscriber 20B, effectively connecting the subscriber 20A with the subscriber 20B.

Alternatively, the IP 90 can release the call control over to the SSP 30B after processing the administrative tasks, such as charging, and allow the SSP 30B to connect the incoming call with the subscriber 20B. This alternative implementation eliminates the need for the IP 90 to utilize two voice channels, one for the incoming call and the other for the subscriber 20B, to establish the connection. If the subscriber 20A is busy when the SSP 30A tries to execute the set up as a result of the InitialCallAttempt message, the SSP 30A places a monitor on the subscriber 20A's line and the line status is continuously checked. Effectively, the SSP 30A performs functions equivalent to the previously mentioned Class Automatic Callback (CAC) and Class Automatic Recall (CAR) features by queuing the request and ordering another call set up as soon as the monitored line is freed. However, according to the preferred embodiment of the present invention, once the monitored subscriber line goes idle, instead of generating a TCAP message toward the other exchange to allow the other exchange to reinitiate a new call setup, the SSP 30A monitoring the line status initiates a call back toward the subscriber 20B directly. This is to make sure that the SSP 30A is the switch that is generating an incoming call into Country B.

If the subscriber 20A is not freed within a predetermined time period, the SCP 70 sends a TCAP message to the Converter 110 with an appropriate message code. Consequently, the Converter 110 encodes the message into an X.25 packet and transmits it over the X.25 network to the IP 90 in Country B. The IP 90 extracts the necessary information from the X.25 packet and accordingly plays an announcement notifying the subscriber 20B that the destination subscriber could not be reached and the call back request has failed. Moreover, if there is hardware congestion or physical failure in the system, other error codes are sent back to the subscriber 20B to notify of the result.

Therefore, if the call back request has failed, no SS7 telecommunications link has ever been established between the subscriber 20B and the subscriber 20A. The request for the call back and the notice of the failure are all communicated over the X.25 based computer network, much like an e-mail, and the subscriber 20B has incurred no telephone service charges. Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for providing call back subscriber features within a communications network, said system comprising:

a first local network in a first country for ordering a call back request;

a second local network in a second country for initiating a call setup to effectuate said call back request;

an Intelligent Peripheral (IP) within said first local network for receiving said call back request and formatting said call back request into a packet;

a computer communications link connecting said first local network to said second local network, for transporting said packet containing said call back request therebetween;

an interface module within said second local network for receiving said call back request packet over said computer communications link from said IP; and a Common Channel Signaling System No. 7 (SS7) telecommunications network connecting said first local network to said second local network to establish a communications link effectuating said call back request from said second local network to said first local network.

2. The system of claim 1 wherein said second local network is implemented using an Intelligent Network (IN) architecture, said network comprising:

a Service Switching Point (SSP) for providing telecommunications switching functions; and a Service Control Point (SCP) for providing telecommunications subscriber features by controlling said Service Switching Point (SSP).

3. The system of claim 1 wherein said computer communications link comprises a X.25 protocol based computer network.

4. The system of claim 3 wherein said interface module comprises a converter that converts a X.25 packet to a Transaction Capabilities Application Part (TCAP) based message to enable said call back request to be compatible with said SS7 telecommunications network.

5. The system of claim 2 wherein said interface module connects said computer communications link to said SCP of said second local network.

6. A system for providing a communications link between a first subscriber within a first country and a second subscriber within a second country, said system comprising:

a first telecommunications network servicing said first subscriber, wherein said first telecommunications network comprises a local switch connected to said first subscriber;

a second telecommunications network servicing said second subscriber, wherein said second telecommunications network comprises:
 a Service Switching Point (SSP) connected to said second subscriber for providing telecommunications switching functions; and
 a Service Control Point (SCP) connected to said SSP for effectuating call back services;

a Common Channel Signaling System No. 7 (SS7) telecommunications link between said first telecommunications network and said second telecommunications network for communicating voice data;

a computer communications network connecting said first country to said second country for communicating packet data;

a first interface device within said first country for receiving a call back request from said first subscriber and transmitting said call back request over said computer communications network; and a second interface device within said second country for receiving said transmitted call back request over said computer communications network and sending the received call back request to said SCP.

7. The system of claim 6 wherein said computer communications network comprises a X.25 protocol based communications network.

8. The system of claim 7 wherein said second interface device comprises a converter that receives X.25 packets over said X.25 protocol based communications network and converts to Transaction Capabilities Application Part (TCAP) messages.

9. The system of claim 6 wherein said first interface device comprises an Intelligent Peripheral (IP) for receiving subscriber data from said first subscriber.

10. The system of claim 9 wherein said IP comprises:
a Dual Tone Multi frequency (DTMF) receiver; and
an announcement machine.

11. The system of claim 9 wherein said IP comprises:
a voice recognition module; and
an announcement machine.

12. A method of providing subscriber call back services for a first subscriber within a first country toward a second subscriber within a second country, wherein said first country and said second country are connected using a Common Channel Signaling System No. 7 (SS7) telecommunications network and a X.25 based computer network, said method comprising the steps of:

receiving a call back request from said first subscriber by an Intelligent Peripheral (IP) within said first country;

formatting said call back request into an X.25 based packet by said IP;

transmitting said X.25 based packet over said X.25 based computer network from said first country to said second country;

receiving said transmitted X.25 based packet by a converter within said second country;

converting said transmitted X.25 based packet into a Transaction Capabilities Application Part (TCAP) message; and effectuating a call back service toward said first subscriber by a Service Control Point within said second country with the information from said received TCAP message.

13. The method of claim 12 wherein said step of formatting said X.25 based packet further comprises the step of formatting in accordance with a Transmission Control Protocol/Internet Protocol (TCP/IP) standard.

14. The method of claim 12 wherein said step of effectuating call back service further comprises the steps of:

ringing said first subscriber located within said first country over said SS7 telecommunications network;

generating an announcement notifying said first subscriber that a call setup is being initiated toward said second subscriber;

initiating a call setup toward said second subscriber; and establishing a telecommunications link between said first subscriber and said second subscriber.

15. The method of claim 14 wherein said step of effectuating call back service further comprises the steps of:

queuing the call back requests if said second subscriber is busy; and initiating a new call setup toward said second subscriber when said second subscriber becomes idle.

16. A system for providing subscriber call back services for a first subscriber within a first country toward a second subscriber within a second country, wherein said first country and said second country are connected using a Common Channel Signaling System No. 7 (SS7) telecommunication network and a X.25 protocol based computer network, said system comprising:

means for receiving a call back request from a first subscriber;

means for formatting said call back request into an X.25 based packet;

means for transmitting said X.25 based packet over said X.25 based computer network;

means for receiving said transmitted X.25 based packet within said second country;

means for converting said transmitted X.25 based packet into a Transaction Capabilities Application Part (TCAP) message;

means for sending said TCAP message to a Service Control Point (SCP) located within said second country; and means for effectuating a call back service toward said first subscriber by said SCP with information from said received TCAP message.

17. The system of claim 16 wherein said means for formatting said call back request into an X.25 based packet comprises the means for formatting in accordance with a Transmission Control Protocol/Internet Protocol (TCP/IP) standard.

18. The system of claim 16 wherein said means for effectuating call back comprises:

means for ringing said first subscriber located within said first country over said SS7 telecommunications network;

means for generating an announcement notifying said first subscriber that a call setup is being initiated toward said second subscriber; and means for initiating a call setup toward said second subscriber; and means for establishing a telecommunications link between said first subscriber and said second subscriber.

19. The system of claim 16 wherein said means for effectuating call back further comprises:

means for queuing the call back request if said second subscriber is busy; and means for initiating a new call setup toward said second subscriber when said second subscriber becomes idle.

* * * * *